(12) United States Patent
Ho

(10) Patent No.: US 7,616,274 B2
(45) Date of Patent: Nov. 10, 2009

(54) COLOR FILTER SUBSTRATE COMPRISING SPACERS, BLACK MATRIX, AND PROTRUSIONS MADE OF THE SAME MATERIAL AND METHOD OF MANUFACTURING THE SAME

(75) Inventor: I-Hua Ho, Taoyuan (TW)

(73) Assignee: Au Optronics Corp., Hsinchu (TW)

( * ) Notice: Subject to any disclaimer, the term of this patent is extended or adjusted under 35 U.S.C. 154(b) by 244 days.

(21) Appl. No.: 11/471,894

(22) Filed: Jun. 20, 2006

(65) Prior Publication Data

US 2007/0229734 A1   Oct. 4, 2007

(30) Foreign Application Priority Data

Apr. 3, 2006   (TW) ............... 95111750 A

(51) Int. Cl.
    G02F 1/1333   (2006.01)
    G02F 1/1337   (2006.01)
    G02F 1/1339   (2006.01)
(52) U.S. Cl. .............. 349/110; 349/129; 349/156
(58) Field of Classification Search .......... 349/106, 349/110, 129, 156
    See application file for complete search history.

(56) References Cited

U.S. PATENT DOCUMENTS

| 5,949,184 | A   | * | 9/1999  | Ohoshi et al. ............ 313/485 |
| 6,140,988 | A   |   | 10/2000 | Yamada ...................... 345/88 |
| 6,275,280 | B1  | * | 8/2001  | Kajita et al. ............... 349/155 |
| 6,281,960 | B1  | * | 8/2001  | Kishimoto et al. .......... 349/156 |
| 6,975,379 | B2  | * | 12/2005 | Kim et al. ................... 349/155 |
| 7,230,662 | B2  | * | 6/2007  | Yi et al. ..................... 349/106 |
| 7,433,004 | B2  | * | 10/2008 | Tsubata et al. .............. 349/106 |
| 2005/0146669 | A1 | * | 7/2005 | Yeh et al. ................... 349/141 |
| 2006/0114378 | A1 | * | 6/2006 | Choi ........................... 349/110 |
| 2006/0158599 | A1 | * | 7/2006 | Koo ............................ 349/155 |

FOREIGN PATENT DOCUMENTS

| JP | 10-239705   | 9/1998 |
| JP | 2001-91727  | 4/2001 |
| JP | 2003-227919 | 8/2003 |

* cited by examiner

Primary Examiner—Michael H. Caley
Assistant Examiner—Charles Chang
(74) Attorney, Agent, or Firm—J.C. Patents

(57) ABSTRACT

A color filter substrate including a substrate, a plurality of color filter patterns, a black matrix, a plurality of spacers, a plurality of protrusions, and a common electrode is provided. The color filter patterns are disposed on the substrate. The black matrix is disposed on the substrate and between the color filter patterns. The spacers are disposed on the black matrix and connected to the black matrix. The protrusions are disposed on the color filter patterns. The black matrix, the spacers, and the protrusions are made of the same material. The common electrode covers the color filter patterns, the black matrix, the protrusions, and the spacers. As mentioned above, a color filter substrate manufactured with low cost is provided.

14 Claims, 16 Drawing Sheets

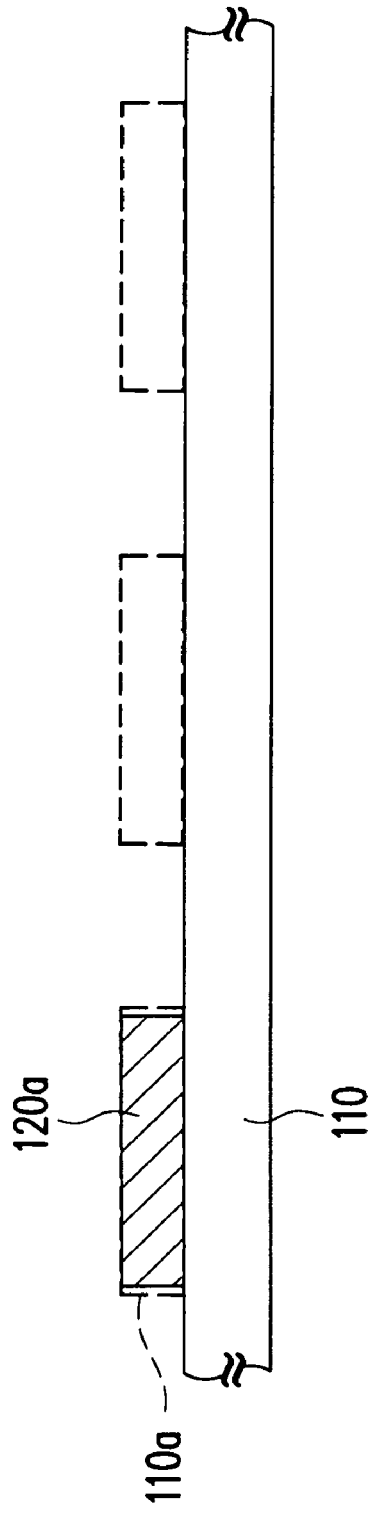
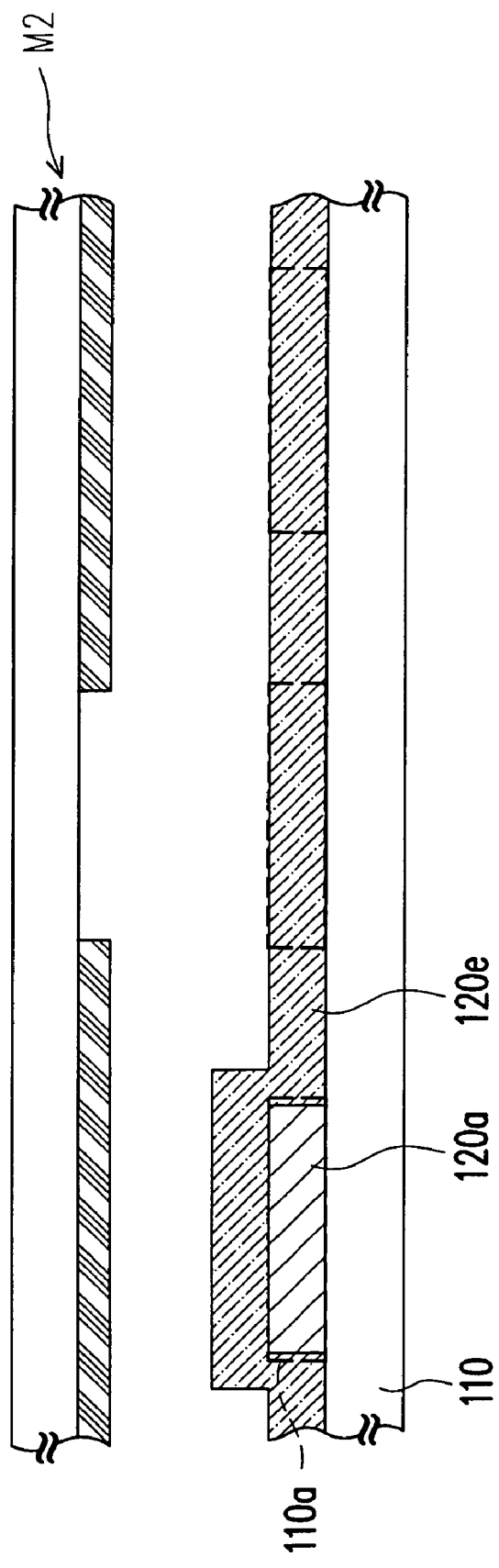

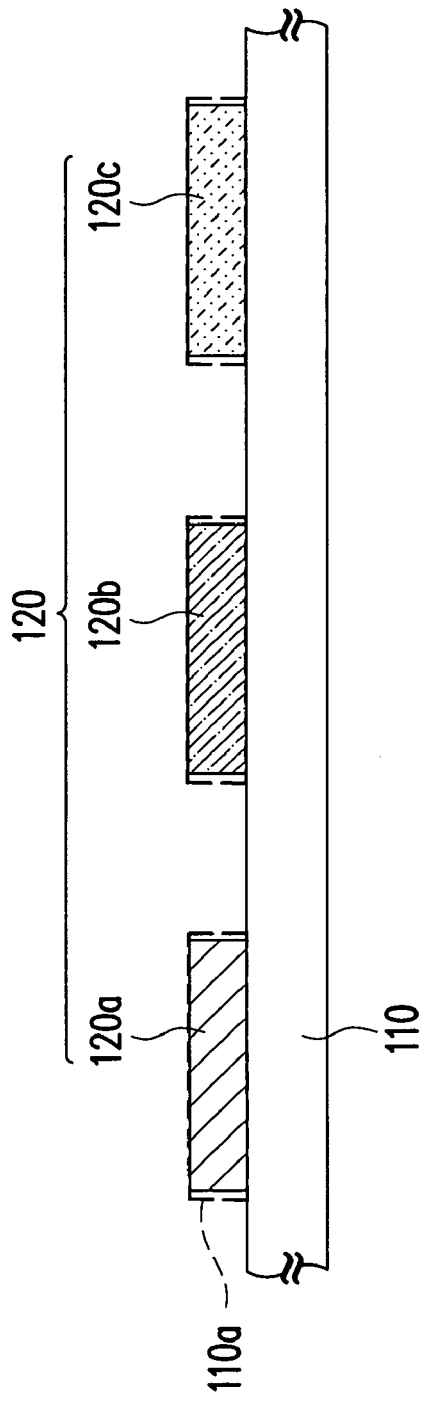
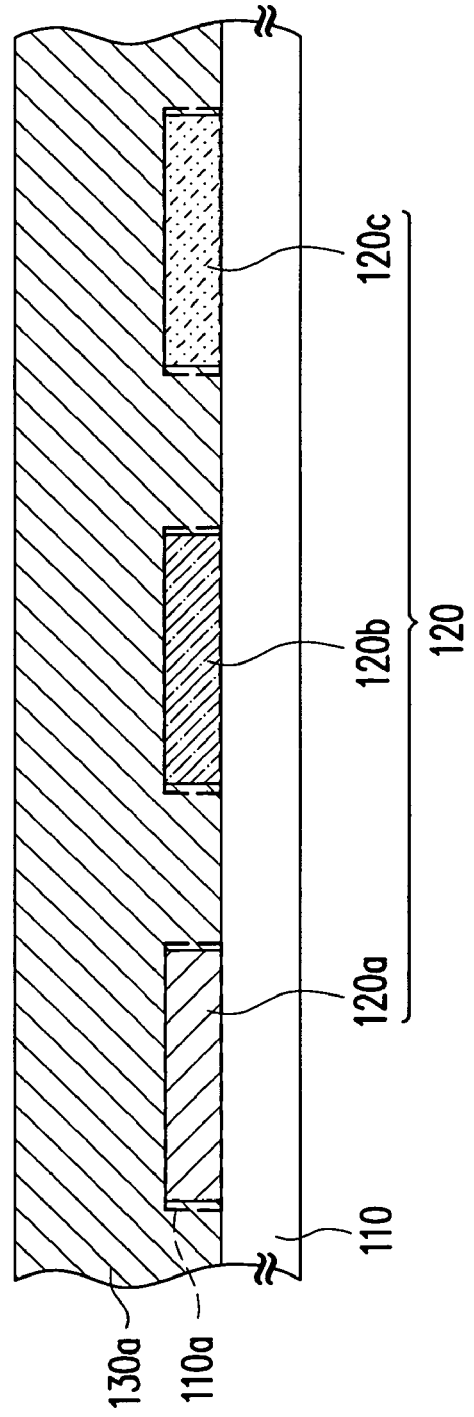

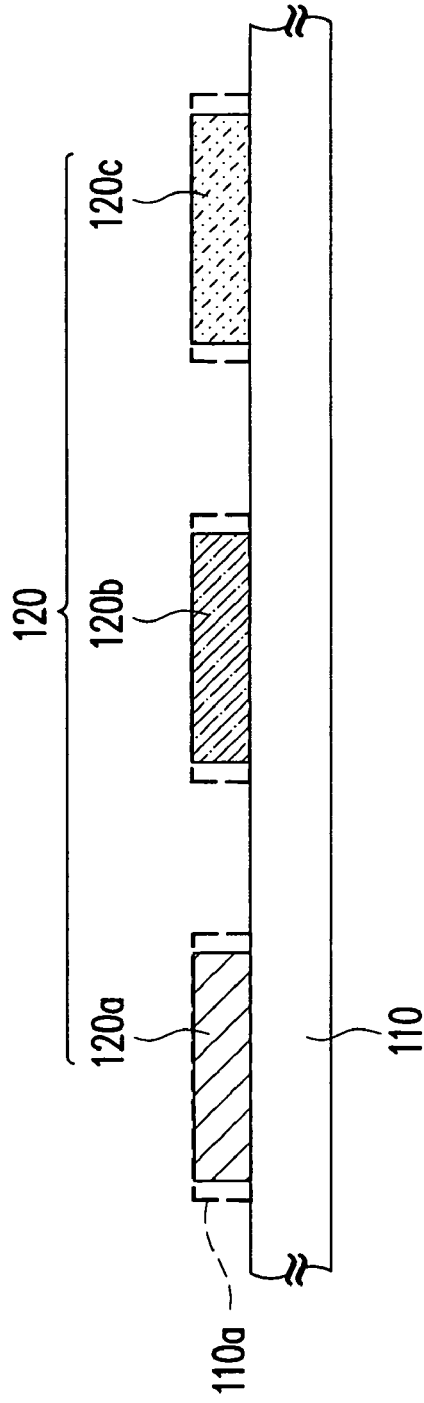
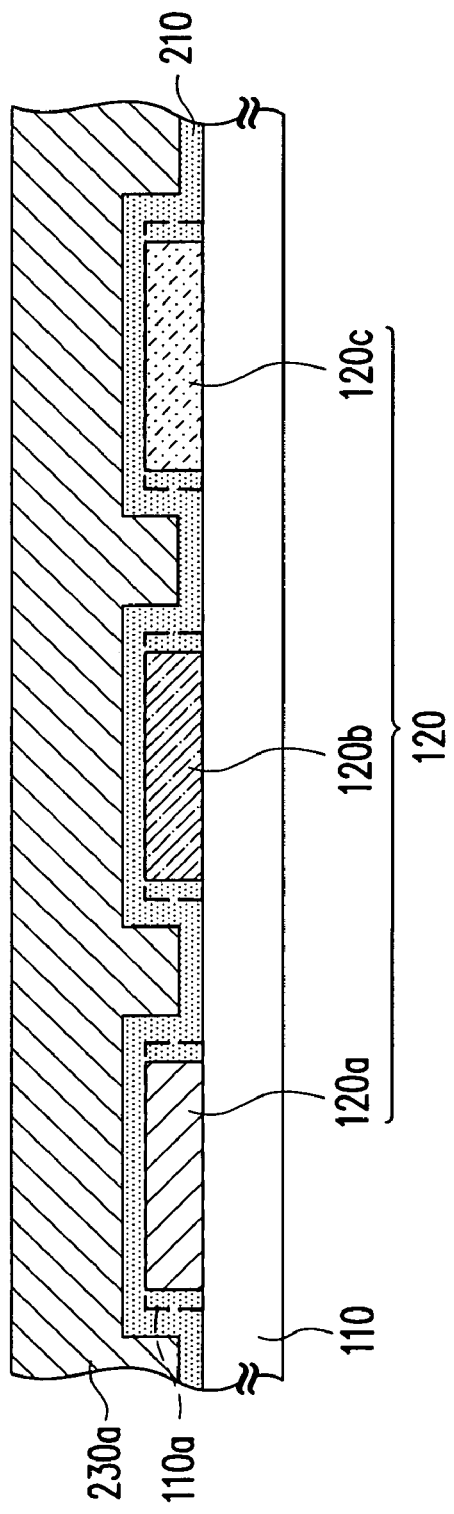

COLOR FILTER SUBSTRATE COMPRISING SPACERS, BLACK MATRIX, AND PROTRUSIONS MADE OF THE SAME MATERIAL AND METHOD OF MANUFACTURING THE SAME

CROSS-REFERENCE TO RELATED APPLICATION

This application claims the priority benefit of Taiwan application serial no. 95111750, filed on Apr. 3, 2006. All disclosure of the Taiwan application is incorporated herein by reference.

BACKGROUND OF THE INVENTION

1. Field of the Invention

The present invention relates to a filter device and a method of manufacturing the same. More particularly, the present invention relates to a color filter substrate and a method of manufacturing the same.

2. Description of Related Art

In response to the increasing demand of displays, the industry put efforts on the development of the relevant displays. Among displays, cathode ray tubes (CRT), due to the high display quality and mature technology, have occupied the display market for years. However, the rise of "environmental protection" awareness is against the disadvantages of high power consumption and high radiation, and the limited flattening capability is against the market demands of lighter, thinner, shorter, smaller, compact, and power-saving displays. Therefore, thin film transistor liquid crystal displays (TFT-LCD), having superior properties such as high image quality, good space utilization, low power consumption and no radiation, have become mainstream display products of the market, in which the color filter substrate is one of the important means of the LCD.

FIGS. 1A to 1G are conventional flow charts of manufacturing a color filter substrate. Referring to FIG. 1A, first a black matrix 12 is formed on a substrate 11 by using a first mask (not shown). Next, as shown in FIGS. 1B to 1D, a plurality of red filter patterns 13a, a plurality of green filter patterns 13b, and a plurality of blue filter patterns 13c are formed over the substrate 11 by sequentially using a second mask (not shown), a third mask (not shown), and a fourth mask (not shown), wherein the red filter patterns 13a, the green filter patterns 13b, and the blue filter patterns 13c form a color filter layer 13. Then, as shown in FIG. 1E, an overcoat layer 14 is formed on the black matrix 12 and the color filter layer 13, and then a common electrode 15 is formed on the overcoat layer 14. After that, as shown in FIG. 1F, a plurality of protrusions 16 is formed on the common electrode 15 above the color filter layer 13 by using a fifth mask (not shown). Then, as shown in FIG. 1G, a plurality of spacers 17 are formed on the common electrode 15 above the black matrix 12 by using a sixth mask (not shown). Then, as shown in FIG. 1H, an alignment film 18 is formed on the common electrode 15, the protrusions 16, and the spacers 17. After completing the above processes, a color filter substrate 10 is then manufactured.

It should be noted that the conventional method of manufacturing the color filter substrate 10 adopts a six-mask process. In order to reduce the time and cost for manufacturing the color filter substrate 10, the process must be changed, and a manufacturing method using fewer masks is adopted. That is, the conventional method of manufacturing the color filter substrate 10 can be significantly improved, thus reducing the manufacturing time and cost of the color filter substrate 10.

SUMMARY OF THE INVENTION

An objective of the present invention is to provide a color filter substrate manufactured with low cost.

Another objective of the present invention is to provide a color filter substrate manufactured with fewer steps.

Still another objective of the present invention is to provide a method of manufacturing the color filter substrate, in which the color filter substrate is manufactured with low cost.

Yet another objective of the present invention is to provide a method of manufacturing the color filter substrate, in which the color filter substrate is manufactured with fewer process steps.

In order to achieve the above or other objectives, the present invention provides a color filter substrate, which comprises a substrate, a plurality of color filter patterns, a black matrix, a plurality of spacers, a plurality of protrusions, and a common electrode. The color filter patterns are disposed on the substrate. The black matrix is disposed on the substrate and between the color filter patterns. The spacers are disposed on the black matrix and connected to the black matrix. The protrusions are disposed on the color filter patterns. The black matrix, the spacers, and the protrusions are made of the same material. The common electrode covers the color filter patterns, the black matrix, the protrusions, and the spacers.

According to the color filter substrate described in an embodiment of the present invention, the substrate has a plurality of sub-pixel regions, and each of the color filter patterns is disposed in one of the sub-pixel regions.

According to an embodiment of the present invention, the color filter substrate further comprises an alignment film disposed on the common electrode.

According an embodiment of the present invention, the color filter patterns comprise at least one red filter pattern, at least one green filter pattern, and at least one blue filter pattern.

The present invention further provides a color filter substrate, which comprises a substrate having a plurality of sub-pixel regions, a plurality of color filter patterns, a common electrode, a black matrix, a plurality of spacers, and a plurality of protrusions. The color filter patterns are disposed on the substrate, and each color filter is disposed within one of the sub-pixel regions. The common electrode covers the color filter patterns and the substrate. The black matrix is disposed on the common electrode and positioned between the sub-pixel regions. The spacers are disposed on the black matrix and connected to the black matrix. The protrusions are disposed on the common electrode above the color filter patterns. The black matrix, the spacers, and the protrusions are made of the same material.

According to an embodiment of the present invention, the color filter substrate further comprises an alignment film. The alignment film covers the common electrode, the black matrix, the protrusions, and the spacers.

According to an embodiment of the present invention, the color filter patterns comprise at least one red filter pattern, at least one green filter pattern, and at least one blue filter pattern.

The present invention further provides a method of manufacturing the color filter substrate, which comprises first providing a substrate. Next, a plurality of color filter patterns is formed on the substrate. Then, a shielding material layer is formed on the substrate to cover the substrate and the color filter patterns. After that, the shielding material layer is patterned to simultaneously form a black matrix, a plurality of protrusions, and a plurality of spacers. A common electrode is formed on the substrate to cover the color filter patterns, the black matrix, the protrusions, and the spacers.

According to an embodiment of the present invention, the step of patterning the shielding material layer comprises first disposing a mask on the shielding material layer, wherein the mask has a transmissive region, a non-transmissive region, and a partially transmissive region. Then, an exposure process and a development process are performed to pattern the shielding material layer, thus forming the black matrix, the protrusions, and the spacers.

According to an embodiment of the present invention, the step of forming the color filter patterns comprises first forming a red filter material on the substrate. The red filter material is patterned to form at least one red filter pattern on the substrate. Then, a green filter material is formed on the substrate. The green filter material is patterned to form at least one green filter pattern on the substrate. And then, a blue filter material is formed on the substrate. The blue filter material is patterned to form at least one blue filter pattern on the substrate.

According to an embodiment of the present invention, the black matrix is formed between the color filter patterns, the spacers are formed on the black matrix, and the protrusions are formed on the color filter patterns.

The present invention further provides a method of manufacturing the color filter substrate, which comprises first providing a substrate having a plurality of sub-pixel regions. A plurality of color filter patterns are formed on the substrate, and each color filter pattern is formed within one of the sub-pixel regions. Next, a common electrode is formed over the substrate to cover the color filter pattern. A shielding material layer is formed on the common electrode. Then, the shielding material layer is patterned to simultaneously form a black matrix, a plurality of protrusions, and a plurality of spacers.

According to an embodiment of the present invention, the step of patterning the shielding material layer comprises first disposing a mask on the shielding material layer, wherein the mask has a transmissive region, a non-transmissive region, and a partially transmissive region. An exposure process and a development process are performed to pattern the shielding material layer, thus forming the black matrix, the protrusions, and the spacers.

According to an embodiment of the present invention, the step of forming the color filter patterns comprises first forming a red filter material on the substrate. The red filter material is patterned to form at least one red filter pattern on the substrate. Then, a green filter material is formed on the substrate. The green filter material is patterned to form at least one green filter pattern on the substrate. And then, a blue filter material is formed on the substrate. The blue filter material is patterned to form at least one blue filter pattern on the substrate.

According to an embodiment of the present invention, the black matrix is formed on the common electrode between the sub-pixel regions, the spacers are formed on the black matrix, and the protrusions are formed on the common electrode above the color filter patterns.

In view of the above, the method of manufacturing the color filter substrate provided by the present invention adopts a process with fewer masks, and thus the color filter substrate can be manufactured in a shorter time period and with low material consumption. According to the above manufacturing method, the color filter substrate is manufactured with low manufacturing cost.

In order to the make aforementioned and other objectives, features and advantages of the present invention comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 3A to 3L are schematic views illustrating a method of manufacturing the color filter substrate according to the first embodiment of the present invention.

FIGS. 5A to 5D are schematic views illustrating a method of manufacturing the color filter substrate according to the second embodiment of the present invention.

DESCRIPTION OF EMBODIMENTS

The First Embodiment

Figure 1A:
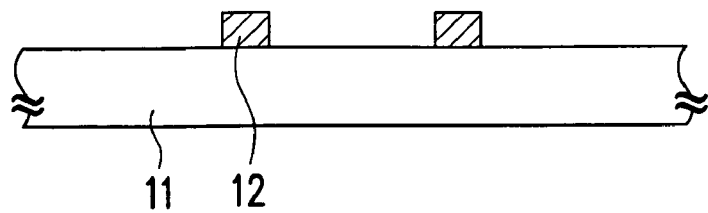
FIGS. 1A to 1H are schematic views illustrating a conventional process of manufacturing a color filter substrate.
Figure 1B:
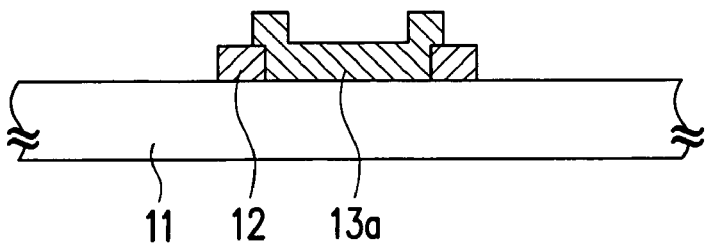
Figure 1C:
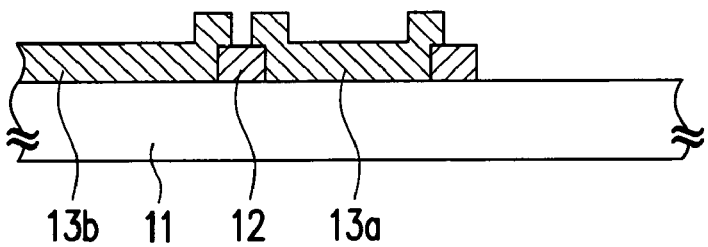
Figure 1D:
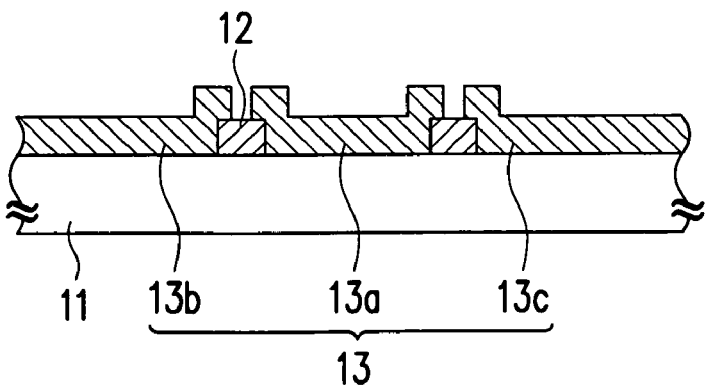
Figure 1E:
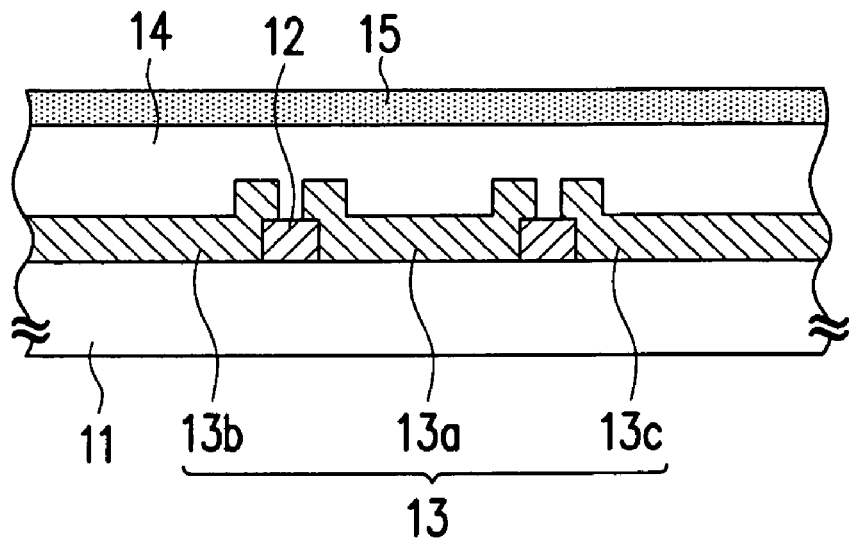
Figure 1F:
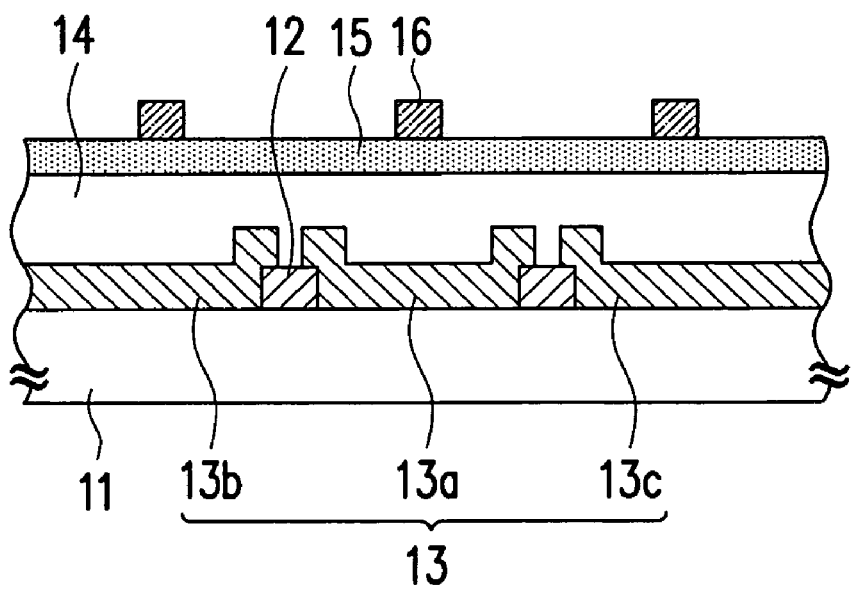
Figure 1G:
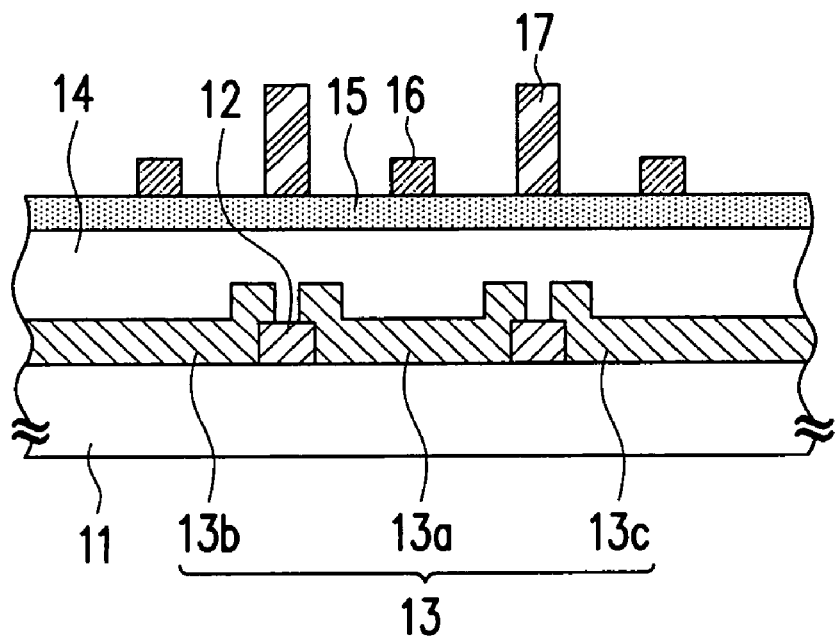
Figure 1H:
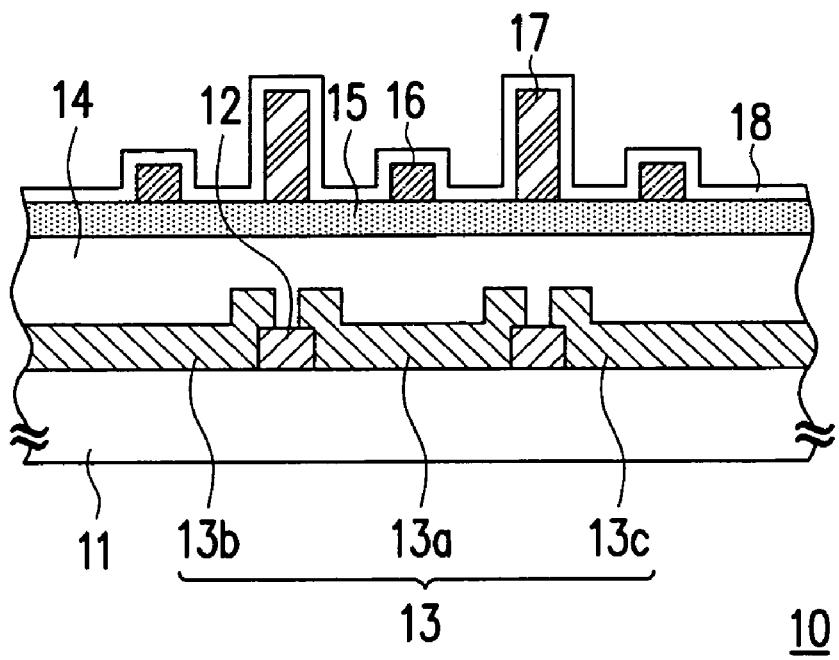
Figure 2:
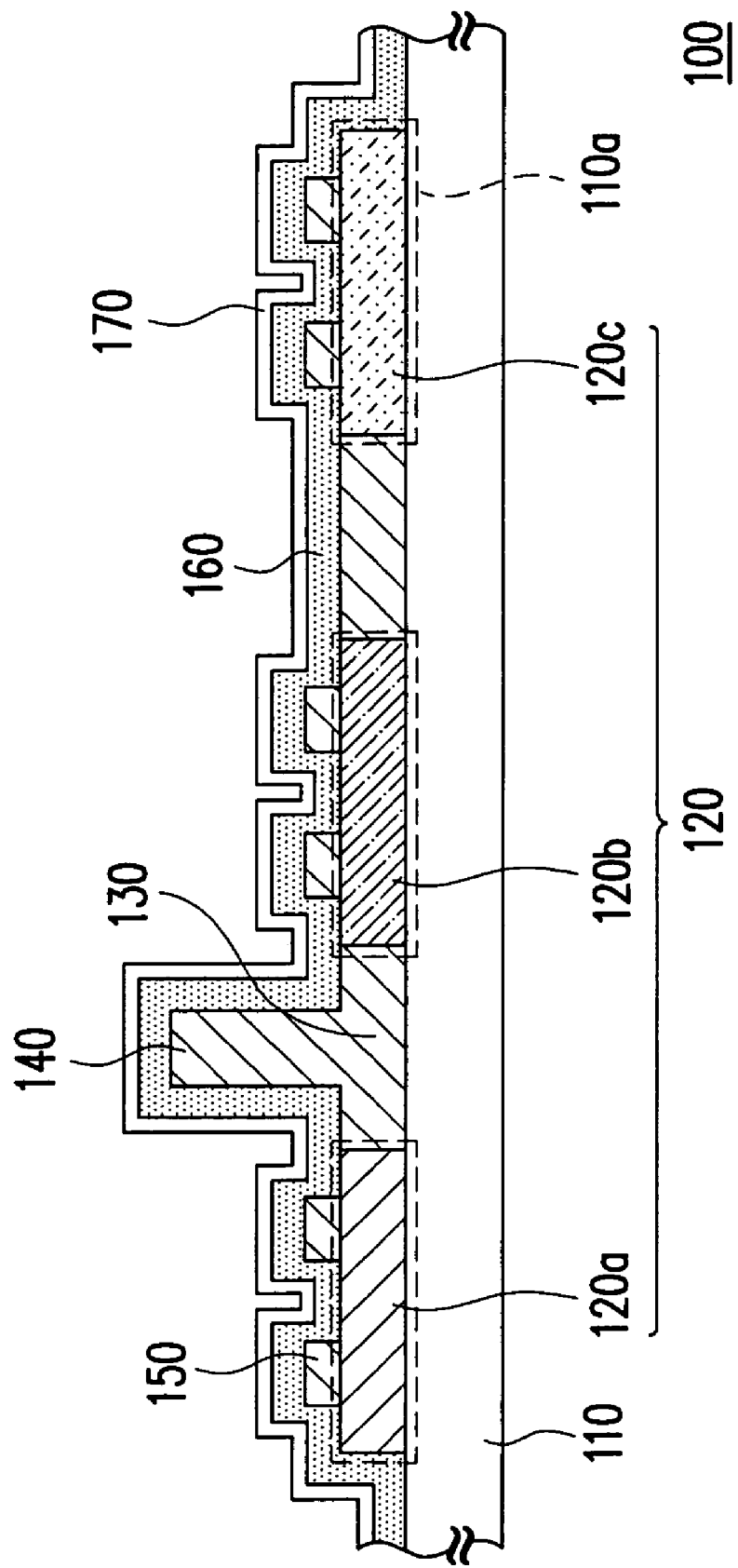
FIG. 2 is a schematic structural view of a color filter substrate according to a first embodiment of the present invention.

FIG. 2 is a schematic structural view of the color filter substrate according to the first embodiment of the present invention. Referring to FIG. 2, a color filter substrate 100 comprising a substrate 110, a plurality of color filter patterns 120, a black matrix 130, a plurality of spacers 140, a plurality of protrusions 150, and a common electrode 160 is provided. The color filter patterns 120 are disposed on the substrate 110. The black matrix 130 is disposed on the substrate 110 and between the color filter patterns 120. The spacers 140 are disposed on the black matrix 130 and connected to the black matrix 130. The protrusions 150 are disposed on the color filter patterns 120. The black matrix 130, the spacers 140, and the protrusions 150 are made of the same material. The common electrode 160 covers the color filter patterns 120, the black matrix 130, the protrusions 150, and the spacers 140.

In the embodiment, the substrate 110 has a plurality of sub-pixel regions 110a, and each of the color filter patterns 120 is disposed in one of the sub-pixel regions 110a. Specifically, the color filter patterns 120 comprise at least one red filter pattern 120a, at least one green filter pattern 120b, and at least one blue filter pattern 120c. Moreover, the color filter substrate 100 further comprises an alignment film 170 disposed on the common electrode 160.

As described above, the substrate 110 is, for example, a glass substrate, a quartz substrate, or a substrate of suitable materials. The material of the color filter patterns 120 (the red filter pattern 120a, the green filter pattern 120b, and the blue filter pattern 120c) is, for example, resin or another suitable material. The black matrix 130, the spacers 140, and the protrusions 150 are made of, for example, black photosensitive resin or another suitable material. The material of the common electrode 160 is, for example, indium tin oxide (ITO), indium zinc oxide (IZO), or any other suitable material. The material of the alignment film 170 is, for example, polyimide resin (PI) or another suitable material. The method of manufacturing the color filter substrate 100 will be described in detail below.

Figure 3A:
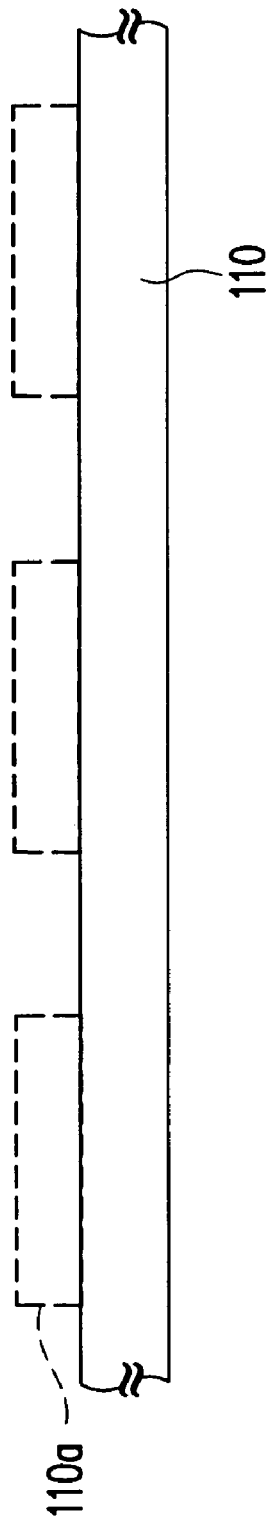

FIGS. 3A to 3J are schematic views illustrating a method of manufacturing the color filter substrate according to the first embodiment of the present invention. Referring to FIG. 3A, a substrate 110 is provided.

Next, color filter patterns 120 are formed on the substrate 110 to form the structure as shown in FIG. 3G. The substrate 110 has a plurality of sub-pixel regions 110a thereon, and each of the color filter patterns 120 in the sub-pixel regions 110a comprises the red filter pattern 120a, the green filter pattern 120b, and the blue filter pattern 120c. The process of forming the color filter patterns 120 is described in detail with reference to FIGS. 3B to 3G.

Figure 3B:
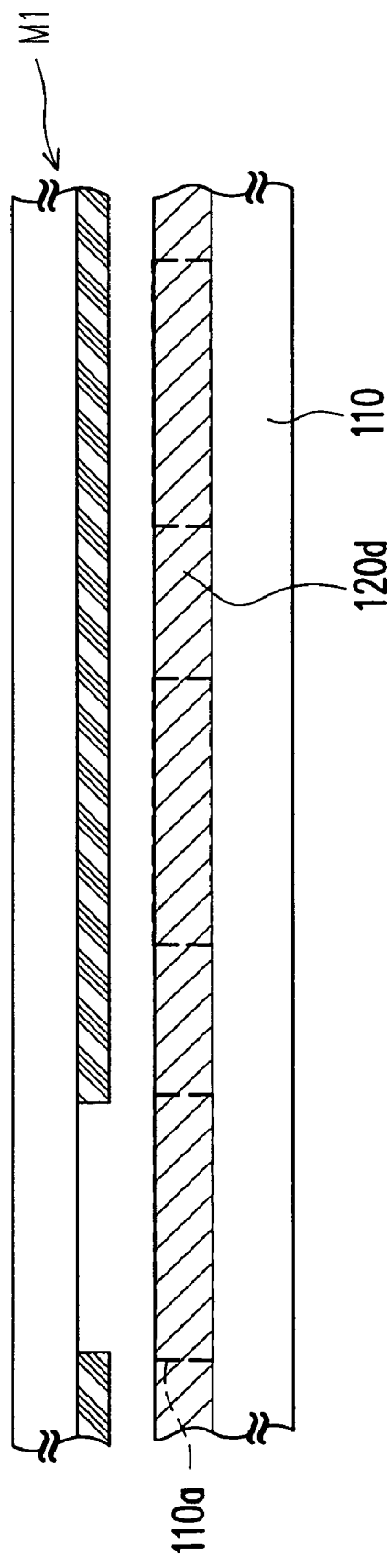

First, as shown in FIG. 3B, a red filter material 120d is formed over the substrate 110. The method of forming the red filter material 120d is, for example, spin-coating or any other suitable method.

Next, a first mask M1 is used to pattern the red filter material layer 120d, thus forming a red filter pattern 120a in a part of the sub-pixel regions 110a on the substrate 110, as shown in FIG. 3C. If the red filter pattern 120a is a photosensitive material, the method of patterning the red filter material 120d includes, for example, performing an exposure process and a development process directly on the red filter material layer 120d by using a first mask M1. If the red filter pattern 120a is not a photosensitive material, a photoresist layer (not shown) must be first formed on the red filter material layer 120d, and the exposure process and the development process are performed on the photoresist layer by using a first mask M1 to form a patterned photoresist layer (not shown). Next, an etching process is performed on the red filter material layer 120d using the patterned photoresist layer as a mask, and then a stripping process is performed on the patterned photoresist layer. Thus, the red filter pattern 120a is formed.

Figure 3E:
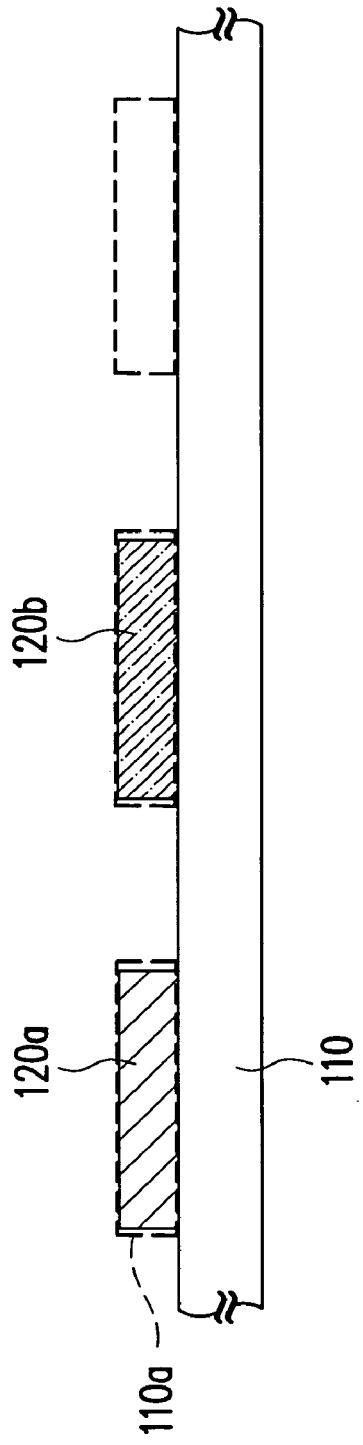

Next, as shown in FIG. 3D, a green filter material layer 120e is formed over the substrate 110. A second mask M2 is used to pattern the green filter material layer 120e to form at least one green filter pattern 120b as shown in FIG. 3E on the substrate 110. Since the method of forming and patterning the green filter material layer 120e is similar to that of the red filter material layer 120d described above, and therefore it will not be repeated again.

Figure 3F:
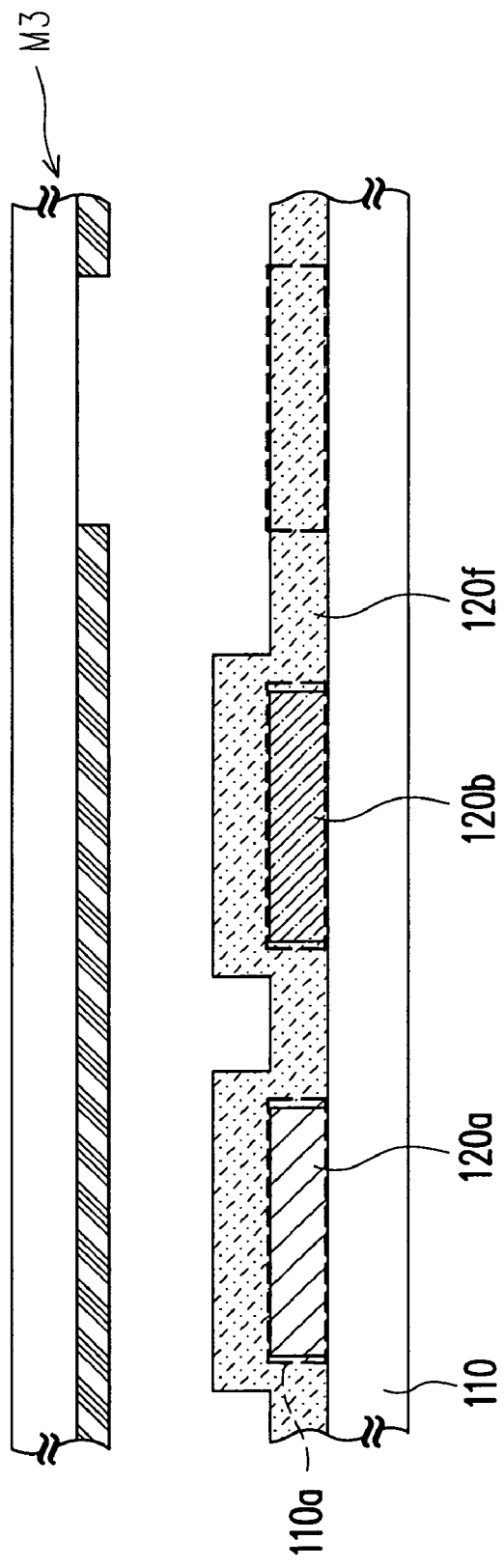

As shown in FIG. 3F, a blue filter material layer 120f is formed over the substrate 110. A third mask M3 is used to pattern the blue filter material layer 120f to form at least one blue filter pattern 120c as shown in FIG. 3G on the substrate 110. Similarly, the method of forming and patterning the blue filter material layer 120f is the same as or similar to the above.

Next, referring to FIG. 3H, a shielding material layer 130a is formed over the substrate 110 to cover the substrate 110 and the color filter patterns 120. The method of forming the shielding material layer 130a is, for example, spin-coating or any other suitable method. It should be noted that the shielding material layer 130a is a photosensitive material.

Figure 3I:
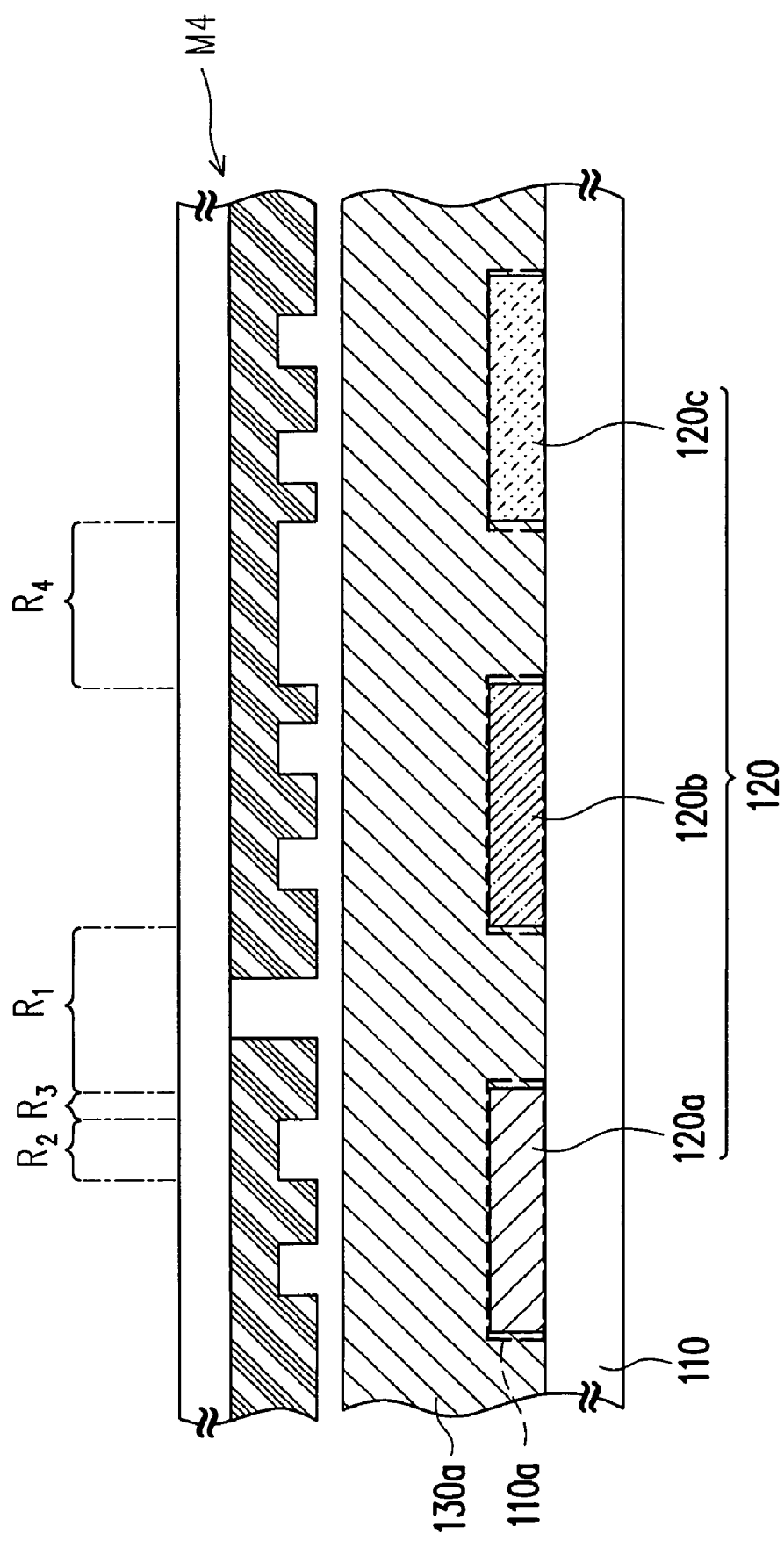
Figure 3J:
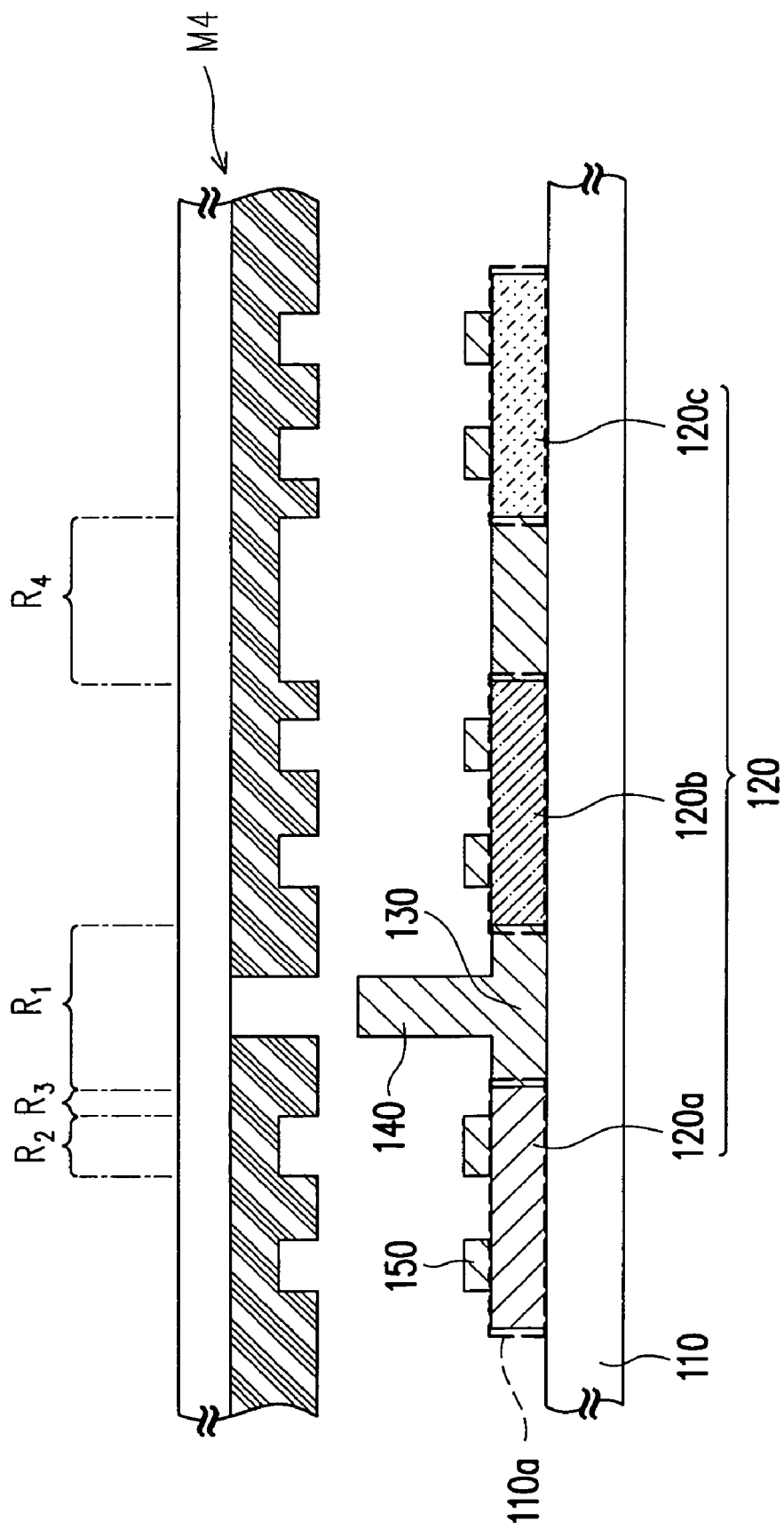

Next, referring to FIGS. 3I to 3J, the shielding material layer 130a is patterned to form a black matrix 130, a plurality of spacers 140, and a plurality of protrusions 150 simultaneously. As shown in FIG. 3I, the method of patterning the shielding material layer 130a includes disposing a mask M4 on the shielding material layer 130a. The mask M4 has a first region R1, a second region R2, a third region R3, and a fourth region R4. The third region R3 is a non-transmissive region; the second region R2 and the fourth region R4 are partially transmissive regions; and the first region R1 is a combination of the transmissive region and the partially transmissive region. Next, as shown in FIG. 3J, an exposure process and a development process are performed to pattern the shielding material layer 130a to form the black matrix 130, the spacers 140, and the protrusions 150.

It should be noted that since the transmitted light intensity through the first region R1, the second region R2, the third region R3, and the fourth region R4 are all different form one another, the resulting photosensitive depths of the regions of the shielding material layer 130a are different. After the development process is performed, the remaining part of the shielding material layer (not shown) forms the black matrix 130, the spacers 140, and the protrusions 150.

Figure 3K:
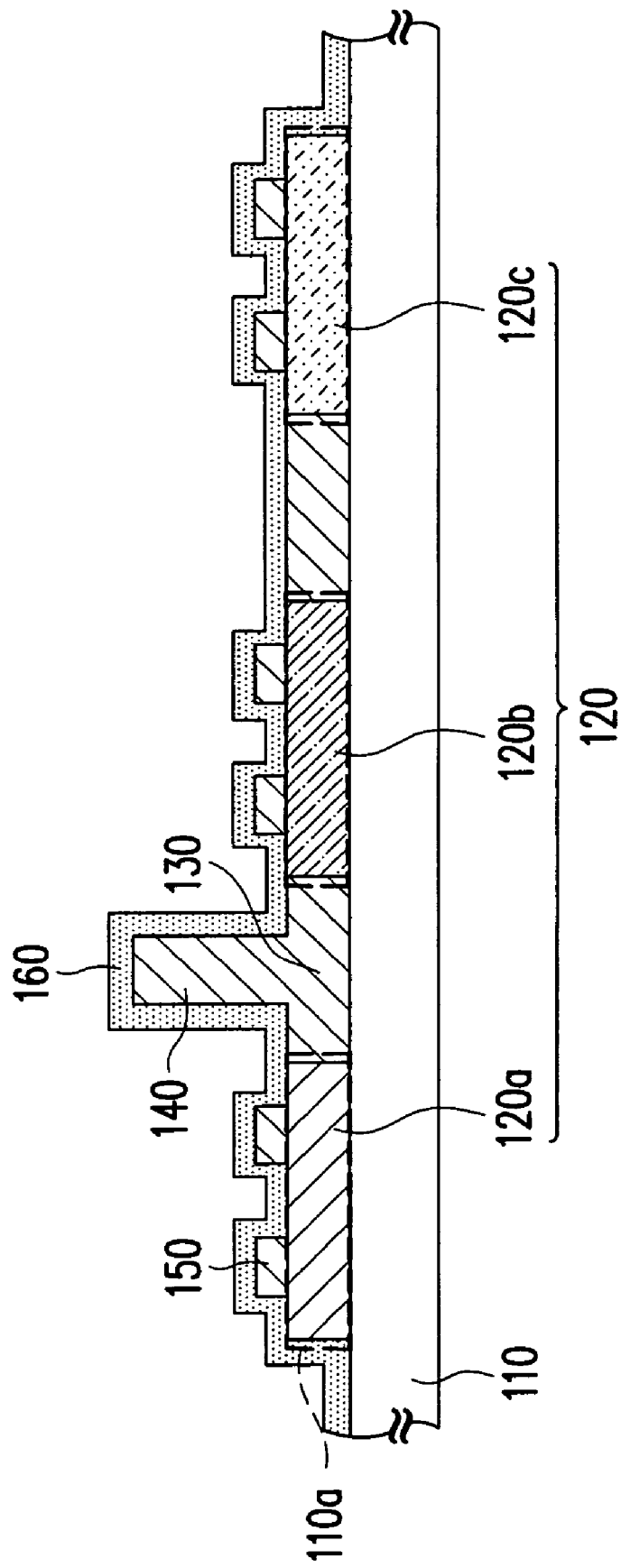

Referring to FIG. 3K, a common electrode 160 is formed on the substrate 110 to cover the color filter patterns 120, the black matrix 130, the spacers 140, and the protrusions 150. The method of forming the common electrode 160 is, for example, sputtering or any other suitable method.

Figure 3L:
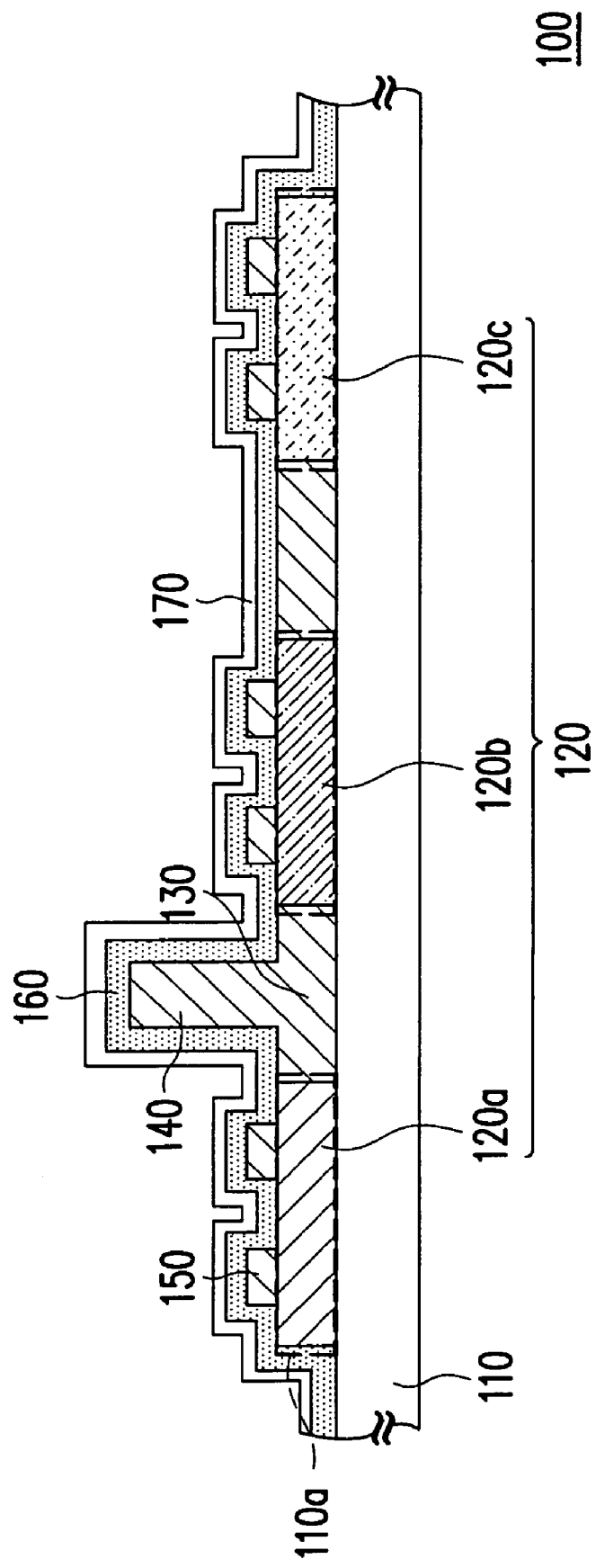

Referring to FIG. 3L, an alignment film 170 is formed on the common electrode 160. The method of forming the alignment film 170 is, for example, offset printing or any other suitable method. Thus, the fabrication of the color filter substrate 100 is completed.

It should be noted that in the method of manufacturing the color filter substrate 100 according to the embodiment of the present invention, the black matrix, the spacers, and the protrusions are formed by using one mask. Compared with conventional techniques in which the black matrix, the spacers, and the protrusions are formed by using three masks, and therefore the method of manufacturing the color filter substrate 100 according to the embodiment present invention can be accomplished in a shorter time period and with low material consumption. In other words, the color filter substrate 100 can be manufactured with fewer steps and low manufacturing cost.

It should be noted that the color filter substrate 100 of the embodiment comprises an alignment film 170, however the step of forming an alignment film may be optional.

The Second Embodiment

Figure 4:
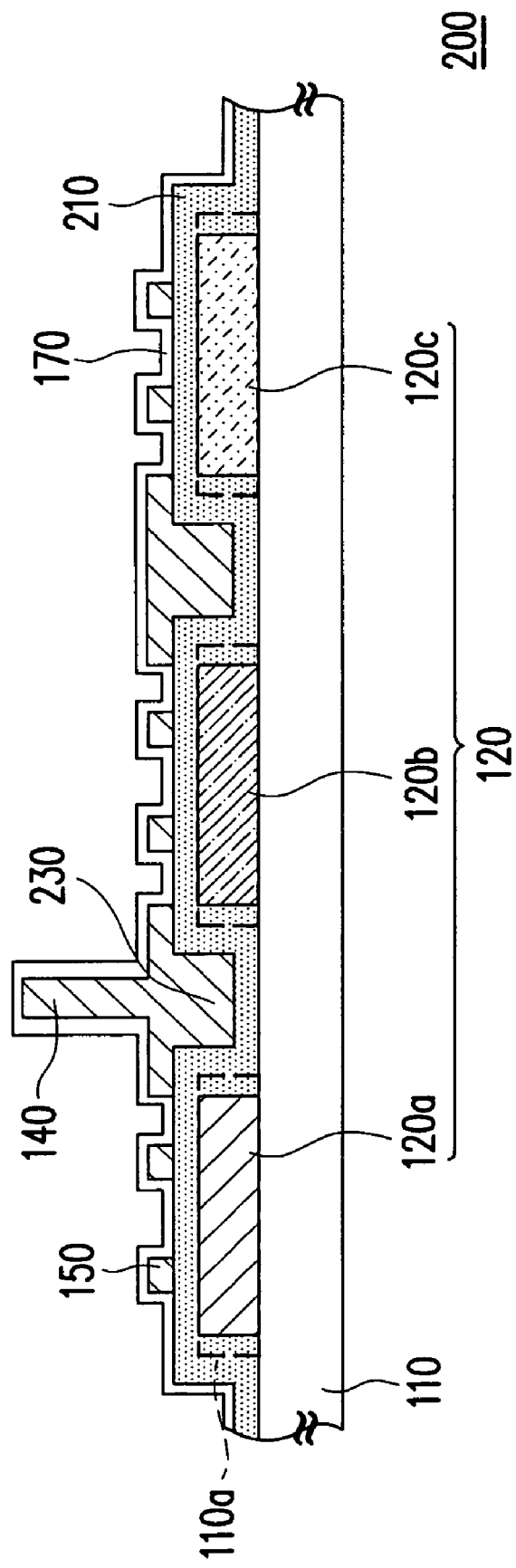
FIG. 4 is a schematic structural view of the color filter substrate according to a second embodiment of the present invention.

FIG. 4 is a schematic structural view of the color filter substrate according to a second embodiment of the present invention. Referring to FIG. 4, a color filter substrate 200 is similar to the color filter substrate 100 in the first embodiment described, except for a common electrode 210 covering the color filter patterns 120 and the substrate 110. Moreover, a black matrix 230 is disposed on the common electrode 210 and between the color filter patterns 120. The protrusions 150 are disposed on the common electrode 210 above the color filter patterns 120. The material of the black matrix 230 and the common electrode 210 is the same as that of the black matrix 130 and the common electrode 160 in the first embodiment.

The method of manufacturing the color filter substrate 200 is similar to the method of manufacturing the color filter substrate 100 described above. FIGS. 5A to 5D are schematic views illustrating the method of manufacturing the color filter substrate 200 according to the second embodiment of the present invention.

Referring to FIG. 5A, a substrate 110 is provided. The substrate 110 has a plurality of sub-pixel regions 110a formed thereon. Next, the red filter pattern 120a, the green filter pattern 120b, and the blue filter pattern 120c are formed in the sub-pixel regions 110a on the substrate 110 through the aforementioned method, thus forming the color filter patterns 120. Since the method of forming the color filter patterns 120 in the sub-pixel regions 110a on the substrate 110 is the same as that described in the first embodiment, and will not be repeated again.

Referring to FIG. 5B, a common electrode 210 is formed over the substrate 110 to cover the color filter patterns 120. The method of forming the common electrode 210 includes, for example, sputtering or another suitable method. Then, a shielding material layer 230a is formed over the substrate 110 to cover the common electrode 210. The method of forming the shielding material layer 230a is, for example, spin-coating or any other suitable method. The shielding material layer 230a is a photosensitive material.

Figure 5C:
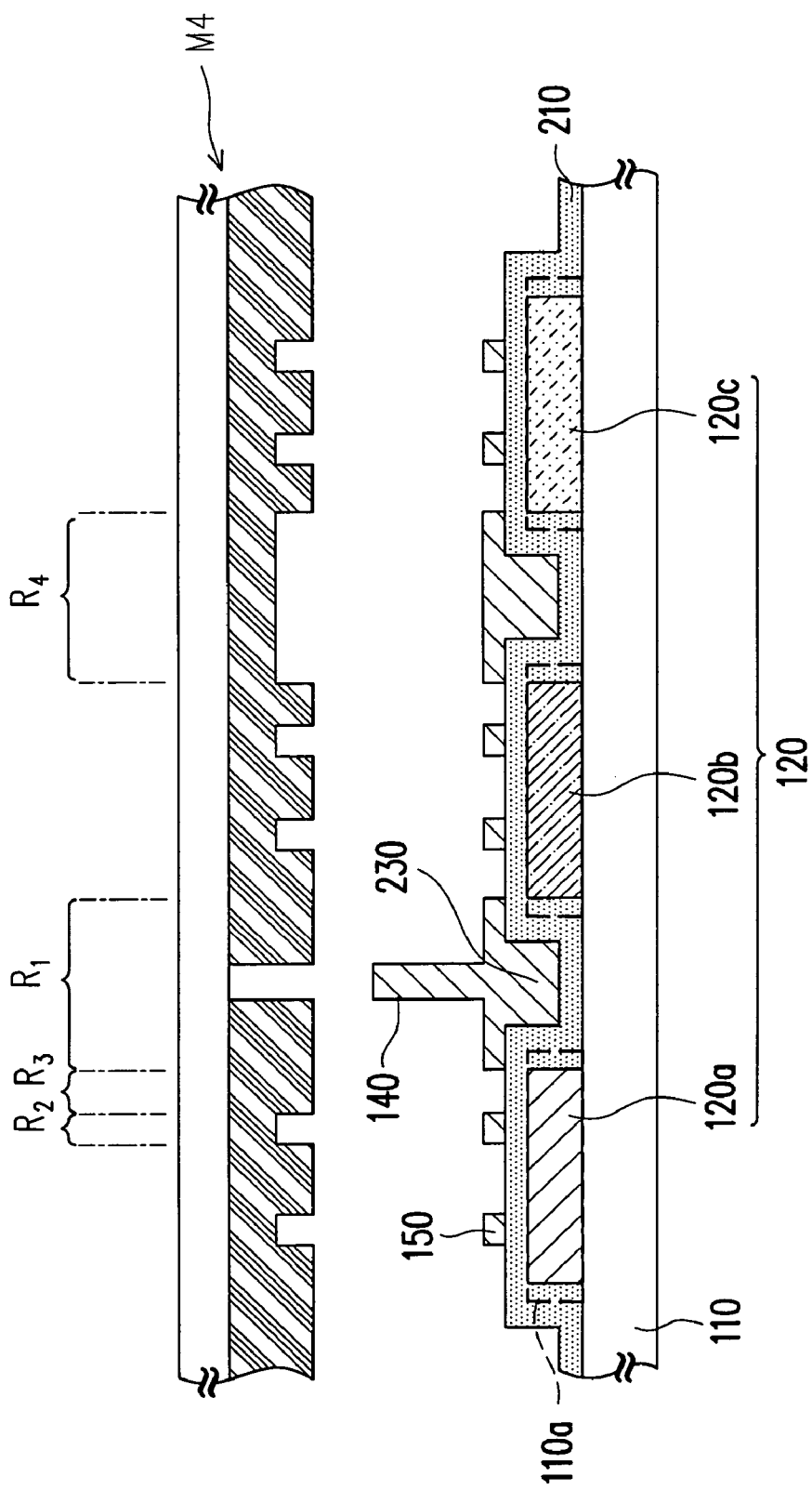

Referring to FIG. 5C, the shielding material layer 230a is patterned by using the mask M4 to simultaneously form a black matrix 230, a plurality of spacers 140, and a plurality of protrusions 150. The method of patterning the shielding material layer 230a is the same as the method described in the first embodiment.

Figure 5D:
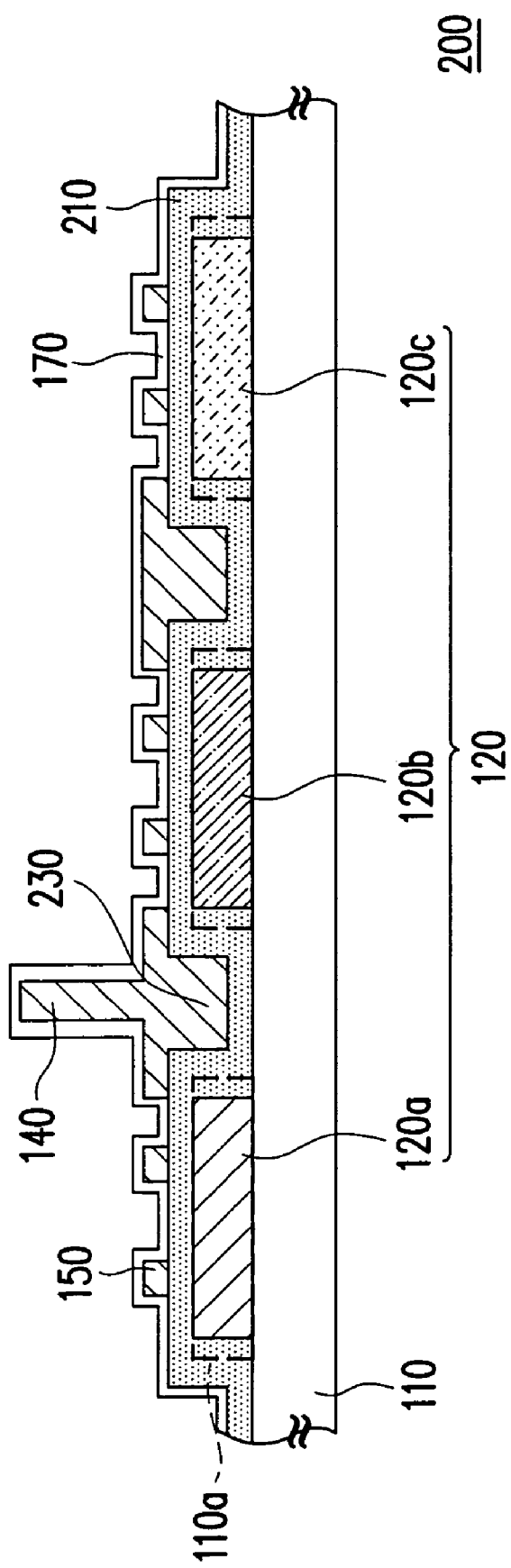

Referring to FIG. 5D, an alignment film 170 is formed on the common electrode 210, the black matrix 130, the spacers 140, and the protrusions 150. The method of forming the alignment film 170 is the same as the method described in the first embodiment. After completing the above steps, the fabrication of the color filter substrate 200 is completed.

Similar to the first embodiment, the black matrix, the spacers, and the protrusions in the method of manufacturing the color filter substrate 200 in the embodiment are formed by using only one mask. Therefore, the method of manufacturing the color filter substrate 200 according to the present invention can be used to manufacture the color filter substrate 200 in a shorter time period and with low material consumption. In other words, the color filter substrate 200 is manufactured with fewer steps and low cost.

It should be noted that the color filter substrate 200 in the embodiment comprises an alignment film 170, but will not limited to this.

To sum up, the method of manufacturing the color filter substrate provided by the present invention employs a fewer masks. Therefore, the color filter substrate can be manufactured in a shorter time period and with low material consumption so that the manufacturing time and cost of the color filter substrate can be significantly reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A color filter substrate, comprising:
   a substrate, wherein the substrate has a plurality of sub-pixel regions;
   a plurality of color filter patterns disposed on the substrate, wherein each of the color filter patterns is disposed in one of the sub-pixel regions;
   a black matrix disposed on the substrate and between the color filter patterns;
   a plurality of spacers disposed on the black matrix and connected to the black matrix;
   a plurality of protrusions disposed on the color filter patterns inside the sub-pixel regions and separated from the black matrix and the plurality of spacers, wherein the black matrix, the spacers, and the protrusions are made of the same material; and
   a common electrode covering the color filter patterns, the black matrix, the protrusions, and the spacers.

2. The color filter substrate as claimed in claim 1, further comprising an alignment film disposed on the common electrode.

3. The color filter substrate as claimed in claim 1, wherein each of the color filter patterns comprises at least one red filter pattern, at least one green filter pattern, and at least one blue filter pattern.

4. A method of manufacturing a color filter substrate, comprising:
   providing a substrate;
   forming a plurality of color filter patterns on the substrate;
   forming a shielding material layer on the substrate to cover the substrate and the color filter patterns;
   patterning the shielding material layer to simultaneously form a black matrix, a plurality of protrusions, and a plurality of spacers, wherein the plurality of protrusions is separated from the black matrix and the plurality of spacers; and
   forming a common electrode on the substrate to cover the color filter patterns, the black matrix, the protrusions, and the spacers.

5. The method of manufacturing the color filter substrate as claimed in claim 4, wherein the method of patterning the shielding material layer comprises:
   disposing a mask on the shielding material layer, wherein the mask has a transmissive region, a non-transmissive region, and a partially transmissive region; and
   performing an exposure process and a development process to pattern the shielding material layer to form the black matrix, the protrusions, and the spacers.

6. The method of manufacturing the color filter substrate as claimed in claim 4, wherein the method of forming the color filter patterns comprises:
   forming a red filter material on the substrate;
   patterning the red filter material to form at least one red filter pattern on the substrate;
   forming a green filter material on the substrate;
   patterning the green filter material to form at Least one green filter pattern on the substrate;
   forming a blue filter material on the substrate; and
   patterning the blue filter material to form at least one blue filter pattern on the substrate.

7. The method of manufacturing the color filter substrate as claimed in claim 4, wherein the black matrix is formed between the color filter patterns, the spacers are formed on the black matrix, and the protrusions are formed on the color filter patterns.

8. The color filter substrate as claimed in claim 1, wherein a step height of the plurality of spacers is greater than a step height of the plurality of protrusions.

9. The method of manufacturing the color filter substrate as claimed in claim 4, wherein the plurality of spacers is formed on the black matrix and connected to the black matrix, and a step height of the plurality of spacers is greater than a step height of the plurality of protrusions.

10. The color filter substrate as claimed in claim 1, wherein compositions of the black matrix, compositions of the spacers, and compositions of the protrusions are the same.

11. The color filter substrate as claimed in claim 1, wherein the spacers and the black matrix are integrally formed, and each of the spacers and the black matrix constitute a T-shaped structure.

12. A method of manufacturing a color filter substrate, comprising:
   providing a substrate, wherein the substrate has a plurality of sub-pixel regions;

forming a plurality of color filter patterns on the substrate, wherein each of the color filter patterns is formed in one of the sub-pixel regions;

forming a shielding material layer on the substrate to cover the substrate and the color filter patterns;

patterning the shielding material layer to simultaneously form a black matrix, a plurality of protrusions, and a plurality of spacers, wherein the plurality of protrusions is formed on the color filter patterns inside the sub-pixel regions and separated from the black matrix and the plurality of spacers, the plurality of spacers is connected to the black matrix, and each of the spacers and the black matrix constitute a T-shaped structure; and forming a common electrode on the substrate to cover the color filter patterns, the black matrix, the protrusions, and the spacers.

13. A color filter substrate, comprising:

a substrate, wherein the substrate has a plurality of sub-pixel regions;

a plurality of color filter patterns disposed on the substrate, wherein each of the color filter patterns is disposed in one of the sub-pixel regions;

a common electrode covering the color filter patterns;

a black matrix disposed on the common electrode and between the color filter patterns;

a plurality of spacers disposed on the black matrix and connected to the black matrix, wherein the plurality of spacers and the black matrix are integrally formed;

a plurality of protrusions disposed on the common electrode above the color filter patterns inside the sub-pixel regions and separated from the black matrix and the plurality of spacers, wherein compositions of the black matrix, the spacers, and the protrusions are the same.

14. A method of manufacturing a color filter substrate, comprising:

providing a substrate;

forming a plurality of color filter patterns on the substrate;

forming a common electrode on the substrate to cover the color filter patterns;

forming a shielding material layer on the substrate to cover the color filter patterns and the common electrode; and patterning the shielding material layer to simultaneously form a black matrix, a plurality of protrusions, and a plurality of spacers, wherein the plurality of protrusions is formed inside the sub-pixel regions and, separated from the black matrix and the plurality of spacers, and the spacers are connected to the black matrix.

* * * * *